(12) United States Patent
Herr et al.

(10) Patent No.: US 12,447,598 B2
(45) Date of Patent: Oct. 21, 2025

(54) HAND-HELD MACHINE TOOL COMPRISING A SPACER ELEMENT

(71) Applicant: Robert Bosch GmbH, Stuttgart (DE)

(72) Inventors: Tobias Herr, Stuttgart (DE); Jens Blum, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 18/524,106

(22) Filed: Nov. 30, 2023

(65) Prior Publication Data
US 2024/0175496 A1    May 30, 2024

(30) Foreign Application Priority Data

Nov. 30, 2022  (DE) .................... 10 2022 212 835.4

(51) Int. Cl.
| | |
|---|---|
| *B25F 5/00* | (2006.01) |
| *B25F 5/02* | (2006.01) |
| *F16J 15/447* | (2006.01) |

(52) U.S. Cl.
CPC ............... *B25F 5/00* (2013.01); *B25F 5/02* (2013.01); *B25F 5/001* (2013.01); *B25F 5/029* (2013.01); *F16J 15/4472* (2013.01)

(58) Field of Classification Search
CPC .... B25F 5/00; B25F 5/02; B25F 5/001; B25F 5/029; B25F 3/00; F16J 15/4472
USPC ..... 173/45–48, 146, 176, 90, 93, 93.5, 93.6, 173/93.7, 213–216
See application file for complete search history.

(56) References Cited

U.S. PATENT DOCUMENTS

| | | | | |
|---|---|---|---|---|
| 3,162,451 | A * | 12/1964 | Brose | F16J 15/4472 277/415 |
| 4,464,593 | A * | 8/1984 | Kofink | H02K 9/19 310/233 |
| 5,158,458 | A * | 10/1992 | Perry | B25B 15/004 433/141 |
| 5,897,454 | A * | 4/1999 | Cannaliato | B25B 21/008 475/263 |
| 6,325,379 | B1 * | 12/2001 | Rapp | F16J 15/002 277/351 |
| 7,437,975 | B1 * | 10/2008 | De Anfrasio | B25B 13/06 81/125 |
| 9,566,692 | B2 * | 2/2017 | Seith | B25B 21/02 |
| 11,285,595 | B2 | 3/2022 | Huggenberger | |
| 11,486,498 | B1 * | 11/2022 | Himmelmann | F16J 15/4472 |

(Continued)

FOREIGN PATENT DOCUMENTS

| | | |
|---|---|---|
| DE | 39 16 495 A1 | 11/1990 |
| DE | 198 51 342 C1 | 4/2000 |

(Continued)

*Primary Examiner* — Robert F Long
(74) *Attorney, Agent, or Firm* — Maginot, Moore & Beck LLP

(57) ABSTRACT

The disclosure relates to a hand-held machine tool comprising a tool receptacle and a housing, in which a drive motor having a motor shaft and a transmission are arranged. The transmission is arranged in a transmission housing, and wherein a spacer element is arranged between the transmission and the drive motor, which spacer element comprises a disc-shaped base body on which a tubular mounting portion is formed for mounting on the motor shaft, said spacer element forming a seal, in particular a labyrinth seal.

9 Claims, 5 Drawing Sheets

(56) References Cited

U.S. PATENT DOCUMENTS

| | | | | |
|---|---|---|---|---|
| 2003/0201110 | A1* | 10/2003 | Bednar | B25F 5/00 173/171 |
| 2004/0163832 | A1 | 8/2004 | Riedl | |
| 2006/0276114 | A1* | 12/2006 | Gallagher | B24B 55/102 451/344 |
| 2008/0075401 | A1* | 3/2008 | Dorner | B25F 5/02 384/478 |
| 2009/0242226 | A1* | 10/2009 | Tokunaga | B25F 5/001 173/178 |
| 2009/0320644 | A1* | 12/2009 | Farrar | F02N 15/046 74/7 E |
| 2010/0102515 | A1 | 4/2010 | Miyazawa et al. | |
| 2010/0170538 | A1* | 7/2010 | Baker | B08B 5/04 409/137 |
| 2010/0276168 | A1* | 11/2010 | Murthy | B25B 21/023 173/93.5 |
| 2011/0147030 | A1 | 6/2011 | Blum et al. | |
| 2011/0233878 | A1* | 9/2011 | Wan | B25B 23/0035 279/9.1 |
| 2012/0305279 | A1* | 12/2012 | Schadow | B25B 23/14 173/171 |
| 2017/0297178 | A1* | 10/2017 | Hsieh | B25B 21/02 |
| 2018/0326564 | A1* | 11/2018 | Rettler | B25B 21/007 |
| 2019/0348887 | A1* | 11/2019 | Kuehne | F16H 57/029 |
| 2019/0375089 | A1* | 12/2019 | Boeck | B24B 23/028 |
| 2021/0054938 | A1* | 2/2021 | Hilbert | F16J 15/442 |
| 2021/0069884 | A1 | 3/2021 | Lang et al. | |
| 2021/0107131 | A1* | 4/2021 | Kuehne | B25F 5/001 |
| 2021/0231213 | A1* | 7/2021 | Miebach | B60T 1/005 |
| 2021/0231216 | A1* | 7/2021 | Baheti | F16J 15/4476 |
| 2022/0018354 | A1* | 1/2022 | Tominaga | F16J 15/3204 |
| 2023/0003263 | A1* | 1/2023 | Abaitancei | F16D 15/00 |
| 2023/0016933 | A1* | 1/2023 | Grimanis | F16J 15/4476 |
| 2024/0033893 | A1* | 2/2024 | Kuehne | B25F 5/02 |
| 2024/0200565 | A1* | 6/2024 | Dell'Agli | F16J 15/3464 |

FOREIGN PATENT DOCUMENTS

| | | | | |
|---|---|---|---|---|
| DE | 102009028144 A1 | * | 2/2011 | ......... F04D 13/0633 |
| DE | 102016206062 A1 | * | 10/2017 | |
| DE | 10 2017 211 779 A1 | | 1/2018 | |
| DE | 10 2016 224 245 A1 | | 6/2018 | |
| DE | 102019207473 A1 | * | 11/2020 | |
| EP | 3 572 191 A1 | | 11/2019 | |
| GB | 2297871 A | * | 8/1996 | ............. B25F 5/008 |

\* cited by examiner

HAND-HELD MACHINE TOOL COMPRISING A SPACER ELEMENT

This application claims priority under 35 U.S.C. § 119 to application no. DE 10 2022 212 835.4, filed on Nov. 30, 2022 in Germany, the disclosure of which is incorporated herein by reference in its entirety.

The present disclosure relates to a hand-held machine tool having a tool receptacle and a housing, in which a drive motor having a motor shaft and a transmission is arranged, the transmission being arranged in a transmission housing, and a spacer element being arranged between the transmission and the drive motor, which element comprises a disc-shaped base body, on which a tubular mounting portion is formed for mounting on the motor shaft.

BACKGROUND

A hand-held machine tool comprising a tool receptacle and a housing in which a drive motor having a motor shaft and a transmission are arranged is known from the prior art. A spacer element is arranged between the transmission and the drive motor and comprises a disc-shaped base body. A tubular mounting portion for mounting on the motor shaft is formed on the disc-shaped base body. In addition, the transmission is associated with a shaft sealing ring or a sealed ball bearing so that no lubricant, e.g., oil/grease, is able to come from the transmission in the direction of the drive motor.

SUMMARY

The disclosure relates to a hand-held machine tool having a tool receptacle and a housing in which a drive motor having a motor shaft and a transmission are arranged, the transmission being arranged in a transmission housing, and a spacer element being arranged between the transmission and the drive motor, which comprises a disc-shaped base body on which a tubular mounting portion is designed for mounting on the motor shaft. The spacer element forms a seal, in particular a labyrinth seal.

The disclosure therefore enables the provision of a hand-held machine tool in which a comparatively short and compact design of the hand-held machine tool is enabled by the spacer element designed as a seal, since a separate sealing element can be omitted.

The mounting portion of the spacer element preferably engages the motor shaft in the transmission housing along the direction of an axis of rotation of the tool receptacle.

A compact connection between the drive motor and the transmission can therefore be enabled in a simple manner.

The transmission preferably comprises an intermediate shaft that forms a pot-shaped receptacle, at least sections of the mounting portion being arranged in the pot-shaped receptacle.

A simple and uncomplicated arrangement of the spacer element can be enabled thereby.

The drive motor preferably comprises a rotor, and a front side of the disc-shaped base body facing away from the mounting portion adjoins the rotor.

At least a substantially gap-free arrangement of the spacer element on the drive motor can be enabled as a result.

The front side of the mounting portion facing the transmission preferably comprises at least one receptacle, which is designed to collect lubricant that is coming from the transmission.

As a result, damage or destruction of the drive motor due to lubricant coming from the transmission can be safely and reliably prevented, at least to a large extent.

According to one embodiment, the receptacle is designed in the manner of an annular ring segment or an annular ring.

A lubricant reservoir can therefore be easily provided, in which the lubricant can be collected.

The transmission preferably comprises a bearing element fixed in the transmission housing, in which bearing element the pot-shaped receptacle of the intermediate shaft is rotatably supported.

The design length of the hand-held machine tool or a corresponding power unit can thus be reduced easily and straightforwardly.

At least sections of the bearing element and the mounting portion are preferably arranged coaxially with respect to one another.

A compact arrangement can therefore be enabled in a simple manner.

The disc-shaped base body preferably features an outer diameter that is greater than an inner diameter of the bearing element.

Overlapping of the disc-shaped base body and the bearing element in the radial direction can be easily and straightforwardly enabled thereby.

Preferably, a radial gap is formed between an outer circumference of the mounting portion and an inner circumference of the pot-shaped receptacle.

A rotational movement of the spacer element with the motor shaft can thereby be facilitated in a simple manner.

BRIEF DESCRIPTION OF THE DRAWINGS

The disclosure is explained in further detail in the following description with reference to design examples shown in the drawings. Shown are.

DETAILED DESCRIPTION

Figure 1:
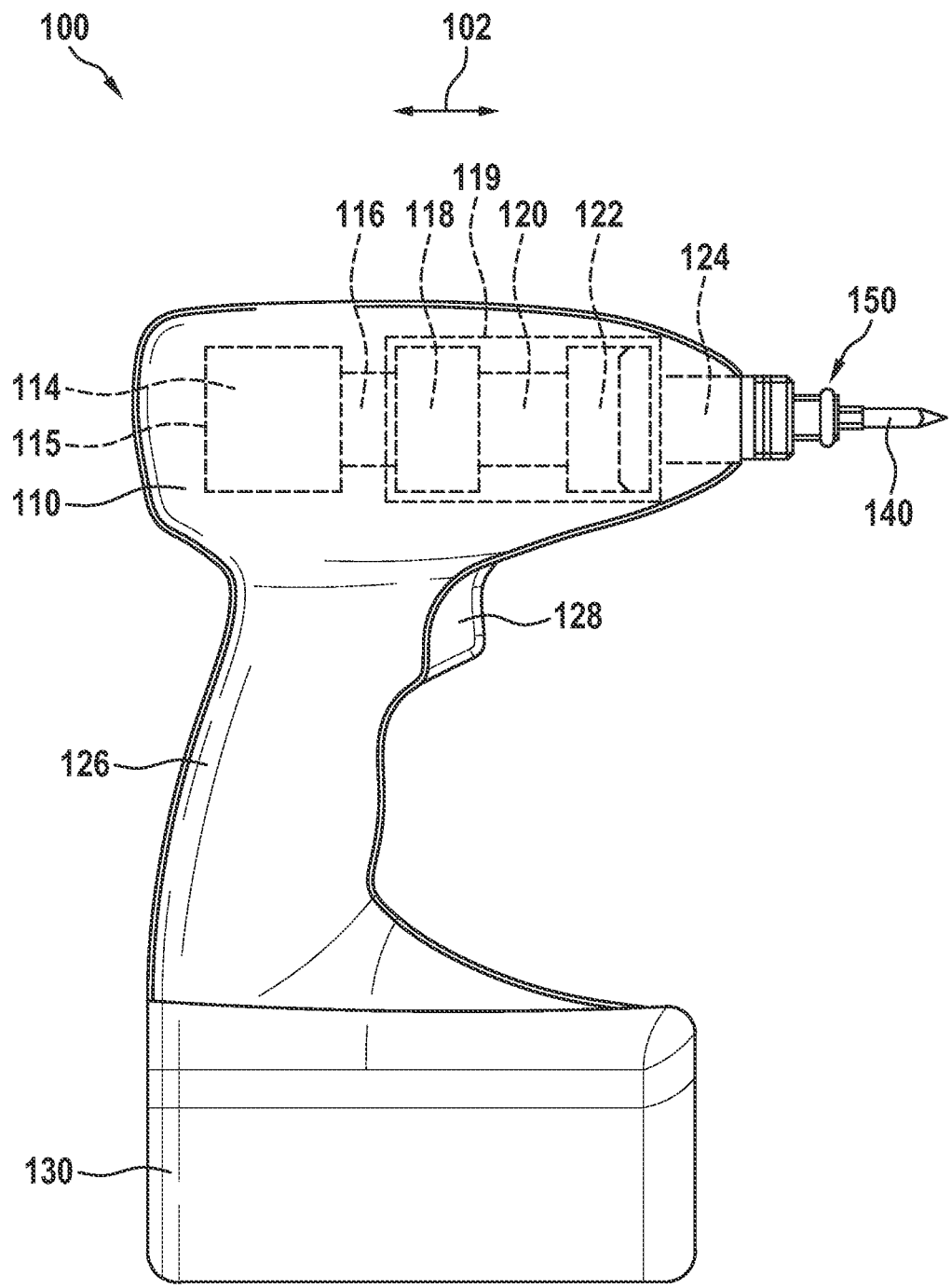
FIG. 1 a schematic view of a hand-held machine tool having a drive motor and a transmission, FIG. 2 a detail of a longitudinal section through the hand-held machine tool in FIG. 1 to illustrate a spacer element arranged between the drive motor and the transmission in FIG. 1, FIG. 3 a perspective view of the spacer element in FIG. 2, FIG. 4 a perspective cross-sectional view of an alternative spacer element, and FIG. 5 a section of a longitudinal section through the hand-held machine tool in FIG. 1 to illustrate the spacer element in FIG. 4 arranged between the drive motor and the transmission in FIG. 1.

Elements having the same or a comparable function are provided with the same reference characters in the drawings and are described in detail only once.

FIG. 1 shows a hand-held machine tool 100 provided with a tool receptacle 150 and having a housing 110 with a handle 126. According to the embodiment shown, the hand-held power tool 100 is mechanically and electrically connectable to a battery pack 130 for electricity supply apart from an electrical network.

Illustratively, a drive motor 114 supplied with electricity by the battery pack 130 and a transmission 118 are arranged within the housing 110. The drive motor 114 is, e.g., operable (i.e., can be switched on and off) via a hand switch 128, and can be any desired type of motor, e.g., an electronically commutated motor or a DC motor. The drive motor 114 can preferably be electronically controlled and/or regulated such that a reversing mode and a specification for a desired rotational speed can be achieved. The functionality and construction of a suitable drive motor are sufficiently known from the prior art, so a detailed description is omitted herein for the purpose of brevity in the description.

The drive motor 114 is connected to the transmission 118 via an associated motor shaft 116, which converts rotation of the motor shaft 116 into rotation of an output shaft 124. This conversion is preferably performed such that the output shaft 124 rotates relative to the motor shaft 116 at increased torque but decreased rotational speed.

The drive motor 114 is illustratively arranged within an engine housing 115. The transmission 118 is arranged within a transmission housing 119. Both the transmission housing 119 and the motor housing 115 are, e.g., arranged inside the housing 110.

According to one embodiment, an optional mechanical rotary impact mechanism 122 is provided. The drive motor 114 is connected to the transmission 118 via an associated motor shaft 116 such that rotation of the motor shaft 116 is converted into rotation of an intermediate shaft 120 provided between the transmission 118 and the optional mechanical rotary impact mechanism 122. The optional mechanical rotary impact mechanism 122 and the transmission 118 are illustratively arranged within a common transmission housing 119. Alternatively, the optional mechanical rotary impact mechanism 122 can also be arranged in a separate rotary impact mechanism housing.

The optional mechanical impact mechanism 122 connected to the intermediate shaft 120 is, e.g., a rotational or rotary impact mechanism that generates high intensity momentum and transmits it to an output shaft 124, e.g., an output spindle. The optional mechanical impact mechanism is hereinafter referred to as the "mechanical rotary impact mechanism 122". The mechanical rotary impact mechanism 122 is in particular provided for driving the tool receptacle 150 in an impacting manner. The mechanical rotary impact mechanism 122 comprises, illustratively, a spring-loaded impact body (205 in FIG. 2), which is coupled to the intermediate shaft 120 and is slidably mounted on the intermediate shaft 120 in the axial direction 102 of the transmission 118.

Provided on the output shaft 124 is a tool receptacle 150, which is preferably designed to receive insertion tools and is preferably connectable to an insertion tool 140 having an outward multi-face coupling. The insertion tool 140 is, e.g., designed as a screwdriver bit having an outward multi-face coupling, illustratively an octagonal coupling. The functionality and construction of a suitable drive motor are sufficiently known from the prior art, so a detailed description is omitted herein for the purpose of brevity in the description. Further provided is a locking unit 190 for locking and unlocking the insertion tool 140, which is illustratively arranged in the tool receptacle 150.

Figure 2:
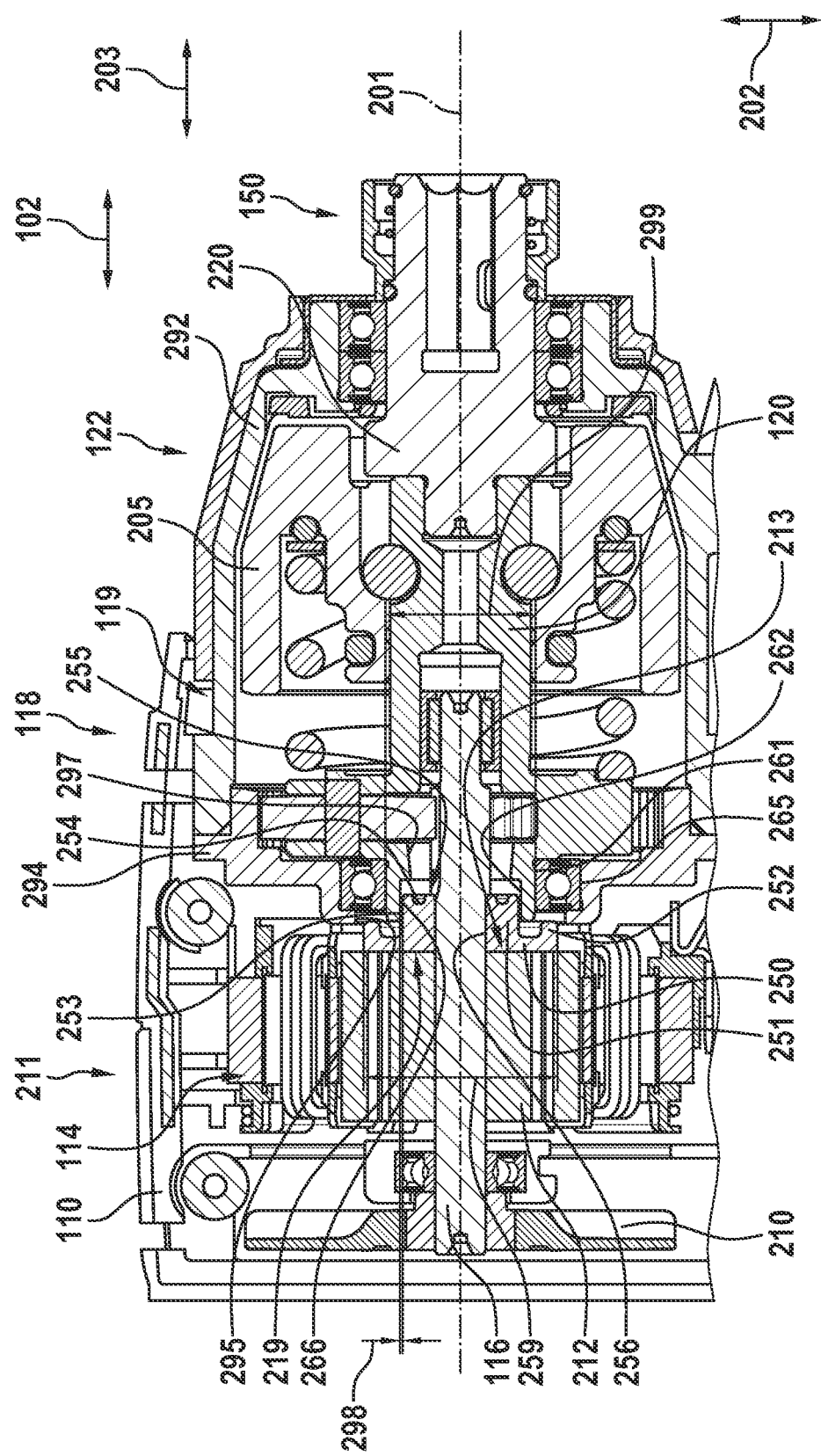

FIG. 2 shows the drive motor 114 arranged within housing 110 and comprising a motor shaft 116 and the transmission 118 in FIG. 1. According to one embodiment, a fan 210 is associated with the drive motor 114. The fan 210 is preferably arranged at, illustratively, a left end of the motor shaft 116. The drive motor 114 is in this case arranged axially between the fan 210 and the transmission 118.

Illustratively, the transmission housing 119 comprises two portions 292, 294, which are connected to one another. The portion 294 is preferably designed as a cover, which is attached to the portion 292. The portion 294 comprises an axial recess 295 facing the drive motor 114, through which the motor shaft 116 illustratively extends into the transmission housing 119. The drive motor 114 further comprises a stator 211 and a rotor 212. The drive motor 114 comprises, e.g., an outer stator 211 and an inner rotor 212.

The tool receptacle 150 illustratively comprises an axial longitudinal extension 203. Preferably, the longitudinal extension 203 is simultaneously an axial longitudinal extension of the motor shaft 116. It is noted that, in the context of the present disclosure, the term "axial" is understood to mean a direction along the longitudinal extension 203 of the tool receptacle 150. Furthermore, the term "radial" is understood to mean a direction approximately perpendicular to the longitudinal extension 203 of the tool receptacle 150. The radial direction 202 is therefore oriented approximately perpendicular to the axial direction 102 of the transmission 118, or rather along the longitudinal extension 203 of the tool receptacle 150. Further, the axial direction 102 is oriented substantially parallel to the longitudinal extension 203 of the tool receptacle 150, or rather parallel to an axis of rotation 201 of the tool receptacle 150.

A spacer element 250 is preferably arranged between the transmission 118 and the drive motor 114. The spacer element 250 comprises a disc-shaped base body 252, on which a tubular or sleeve-shaped mounting portion 251 is formed for mounting on the motor shaft 116.

An interior receptacle 256 of the tubular mounting portion 251 of the spacer element 250 facing the motor shaft 116 is preferably arranged on an outer circumference of the motor shaft 116. The spacer element 250 is preferably designed to be rotatable with the motor shaft 116. The tubular mounting portion 251 is preferably oriented in the axial direction 102.

According to the disclosure, the spacer element 250 forms a seal, in particular a labyrinth seal. The mounting portion 251 of the spacer element 250 in this case preferably engages the motor shaft 116 in the transmission housing 119 axially, or rather along the direction of the rotational axis 201 of the tool receptacle 150.

According to one embodiment, the intermediate shaft 120 associated with the transmission 118 comprises a pot-shaped receptacle 262. In this case, at least portions of the mounting portion 251 are preferably arranged in the pot-shaped receptacle 262.

A front side 219 of the disc-shaped base body 252 facing away from the mounting portion 251 preferably adjoins the rotor 212 axially. A front side 255 of the mounting portion 251 facing the transmission 118 preferably comprises at least one receptacle 254, which is designed to collect lubricant, e.g., grease and/or oil, coming from the transmission 118. According to one embodiment, the receptacle 254 is designed in the manner of an annular ring segment or an annular ring. Preferably, the intermediate shaft 120 in the axial direction 102 (illustratively at right) comprises a ramp 297 adjacent the pot-shaped receptacle 262. The ramp 297 is preferably designed at an incline in the direction of the spacer element 250.

When operating the hand-held machine tool 100 in FIG. 1, or when the motor shaft 116 rotates, a lubricant is applied along the ramp 297 in the direction of the spacer element 250, or rather into the receptacle 254. The lubricant is collected in the receptacle 254, preventing lubricant from coming onto the transmission housing 119.

The transmission 118 preferably comprises a bearing element 265 fixed in the transmission housing 119. In particular, the bearing element 265 is preferably designed as a roller bearing, in particular a ball bearing. The intermediate shaft 120, in particular the pot-shaped receptacle 262 of the intermediate shaft 120, is preferably rotatably supported on an inner circumference of the bearing element 265 facing the intermediate shaft 120. Moreover, the bearing element 265 is arranged radially between the transmission housing 119 and the pot-shaped receptacle 262. The bearing element 265 is in particular arranged on an outer circumference 261 portion of the intermediate shaft 120 facing the drive motor 116. The spacer element 250 is also preferably arranged radially between the intermediate shaft 120 and the pot-shaped receptacle 262.

At least sections of the bearing element 265 and the mounting portion 251 of the spacer element 250 are arranged coaxially with respect to one another. Portions of the bearing element 265 and the mounting portion 251 thereby overlap in the axial direction 102.

Illustratively, the disc-shaped base body 252 features an outer diameter 259. The outer diameter 259 is preferably greater than an inner diameter 299 of the bearing element 265. Furthermore, a diameter of a receptacle 295 associated with the portion 294 of the transmission housing 119 is preferably greater than the diameter 259 of the spacer element 250 or the disc-shaped base body 252. The radially outward section of the disc-shaped base body 252 further comprises an annular collar (340 in FIG. 3). Illustratively, the annular collar (340 in FIG. 3) engages the receptacle 295 axially.

According to one embodiment, a radial gap 298 is formed between an outer diameter 253 of the mounting portion 251 and an inner diameter 266 of the pot-shaped receptacle 262. The radial gap 298 preferably features a width in the range from 0.8 mm to 1.6 mm. The spacer element 250 further features plastic and/or brass.

Furthermore, FIG. 2 shows mechanical rotary impact mechanism 122, which preferably comprises a spring-loaded impact body 205 and an anvil 220 that can be impacted by the impact body 205. The anvil 220 is preferably associated with the tool receptacle 150. The mechanical rotary impact mechanism 122 generates high-intensity momentum and transmits it to the output shaft 124, or via the anvil 220 to the tool receptacle 150. The spring-loaded impact body 205 is slidably supported in the axial direction 102 of the transmission 118. A mechanical rotary impact mechanism 122 of this kind is sufficiently known from the prior art, so a detailed description is omitted herein for the purpose of brevity in the description.

Figure 3:
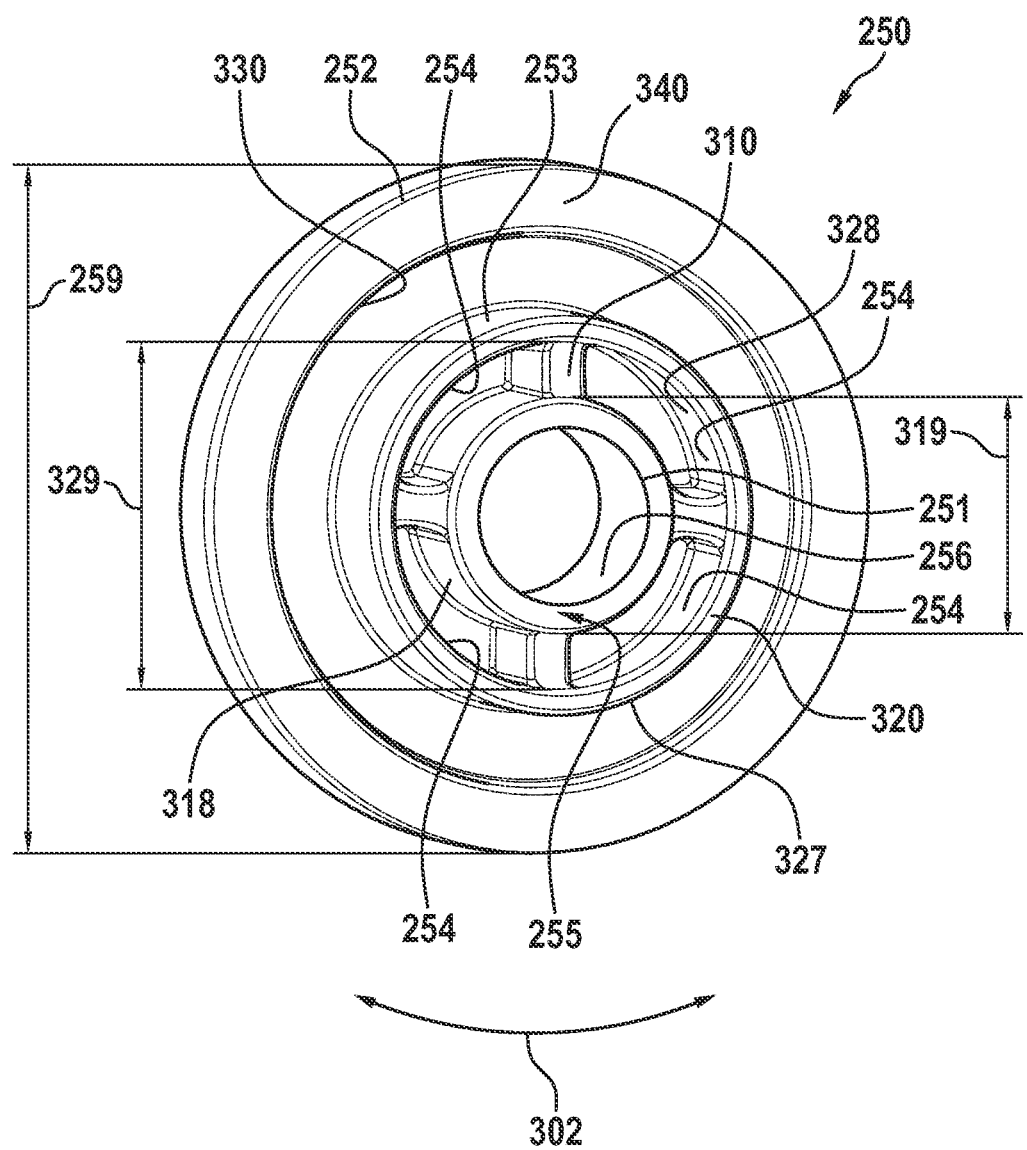

FIG. 3 shows the spacer element 250, in FIG. 2 comprising a disc-shaped base body 252 and the tubular mounting portion 251. FIG. 3 illustrates the at least one receptacle 254 arranged on the front side 255 of the mounting portion 251. According to one embodiment, an annular collar 320 is arranged to be coaxial with the mounting portion 251. An outer diameter 327 of the annular collar 320 preferably forms the outer diameter 253 of the mounting portion 251.

Illustratively, the annular collar 320 features an inner diameter 329 facing the mounting portion 251. The mounting portion 251 further features an outer diameter 319 facing the annular collar 320. Preferably, the receptacle 254 is formed radially between the outer diameter 319 and the inner diameter 329. Preferably, the receptacle 254 is radially formed between an inner diameter 328 of the annular collar 320 and an outer diameter 318 of the mounting portion 251.

Illustratively, four receptacles 254 are formed. The illustratively four receptacles 254 are preferably designed according to the type of annular ring segment. In this case, a separation bar 310 is arranged between two respective receptacles 254 adjacent in the circumferential direction 302 of the spacer element 250. The illustratively four separation bars 310 are in this case radially oriented.

It should be noted that more than four receptacles 254 or fewer than four receptacles 254 can also be provided. Furthermore, the separation bars 310 can be arranged in any desired direction, which need not be radial.

In addition, the radially outward section of the disc-shaped base body 252 illustratively comprises an annular collar 340. A receptacle 330 is preferably arranged radially between annular collar 340 and annular collar 320. An axial width of annular collar 340 is preferably smaller than an axial width of annular collar 320. The diameter 259 of the disc-shaped base body 252 is simultaneously the outer diameter of the annular collar 340.

Figure 4:
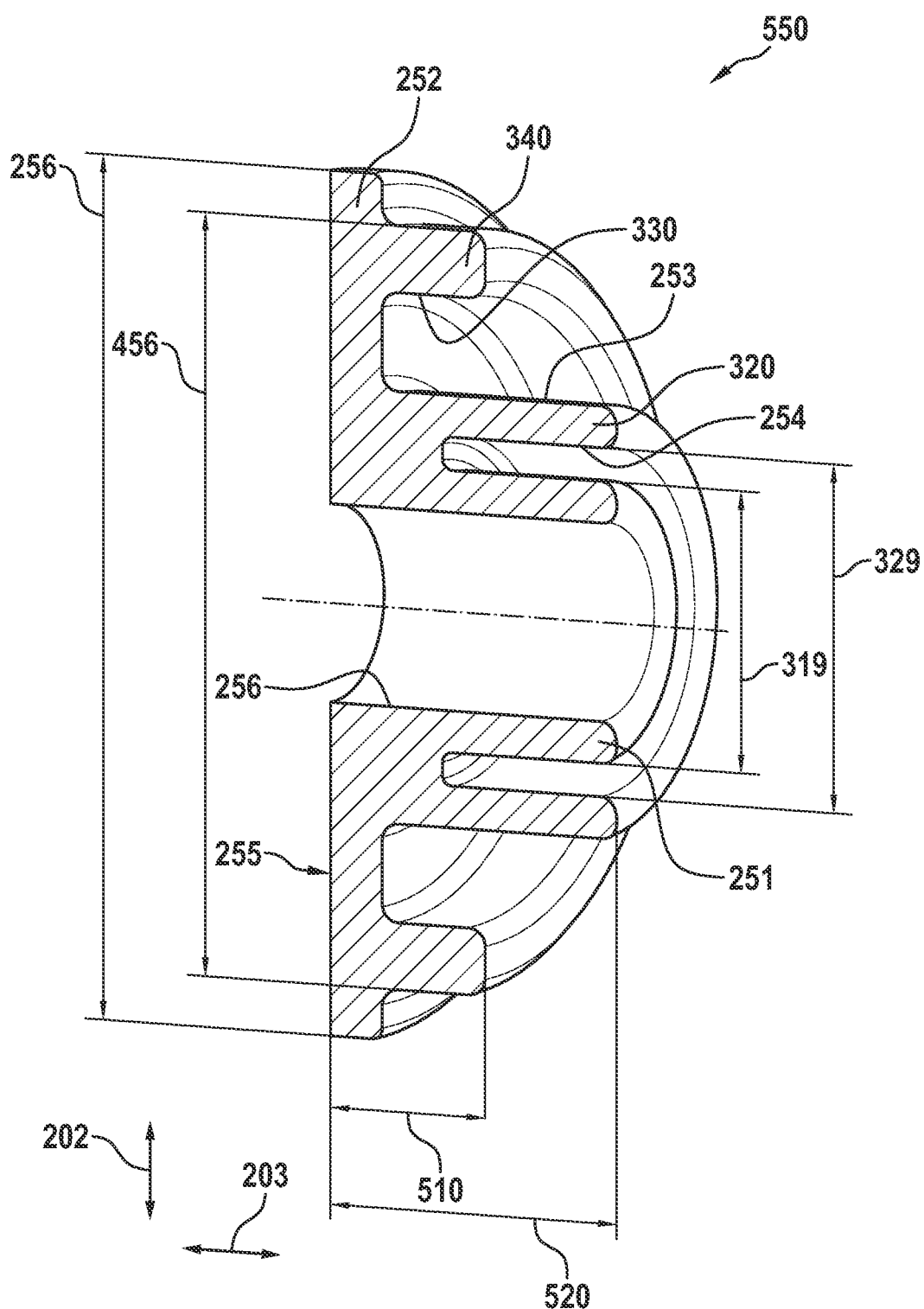

FIG. 4 shows an alternative spacer element 550 comprising the disc-shaped base body 252, the annular collar 310, 340, the mounting portion 251, and a receptacle 254 in FIG. 2 and FIG. 3. According to one embodiment, the receptacle 254 is designed as an annular ring without separation bars 310 in FIG. 3.

The annular collar 340 in FIG. 4 further features an outer diameter 456. The outer diameter 456 is less than the diameter 256 of the disc-shaped base body 252. Furthermore, FIG. 4 illustrates an axial width 510 of the annular collar 340 and an axial width 520 of the mounting portion 251 and of the annular collar 320. Illustratively, the axial width 520 of the annular collar 320 and the mounting portion 251 are equal in size. However, the axial widths of the annular collar 320 and the mounting portion 251 can also be different. The axial width 510 of the annular collar 340 is preferably less than the axial width 520 of the tubular mounting portion 251 and of the annular collar 320.

Figure 5:
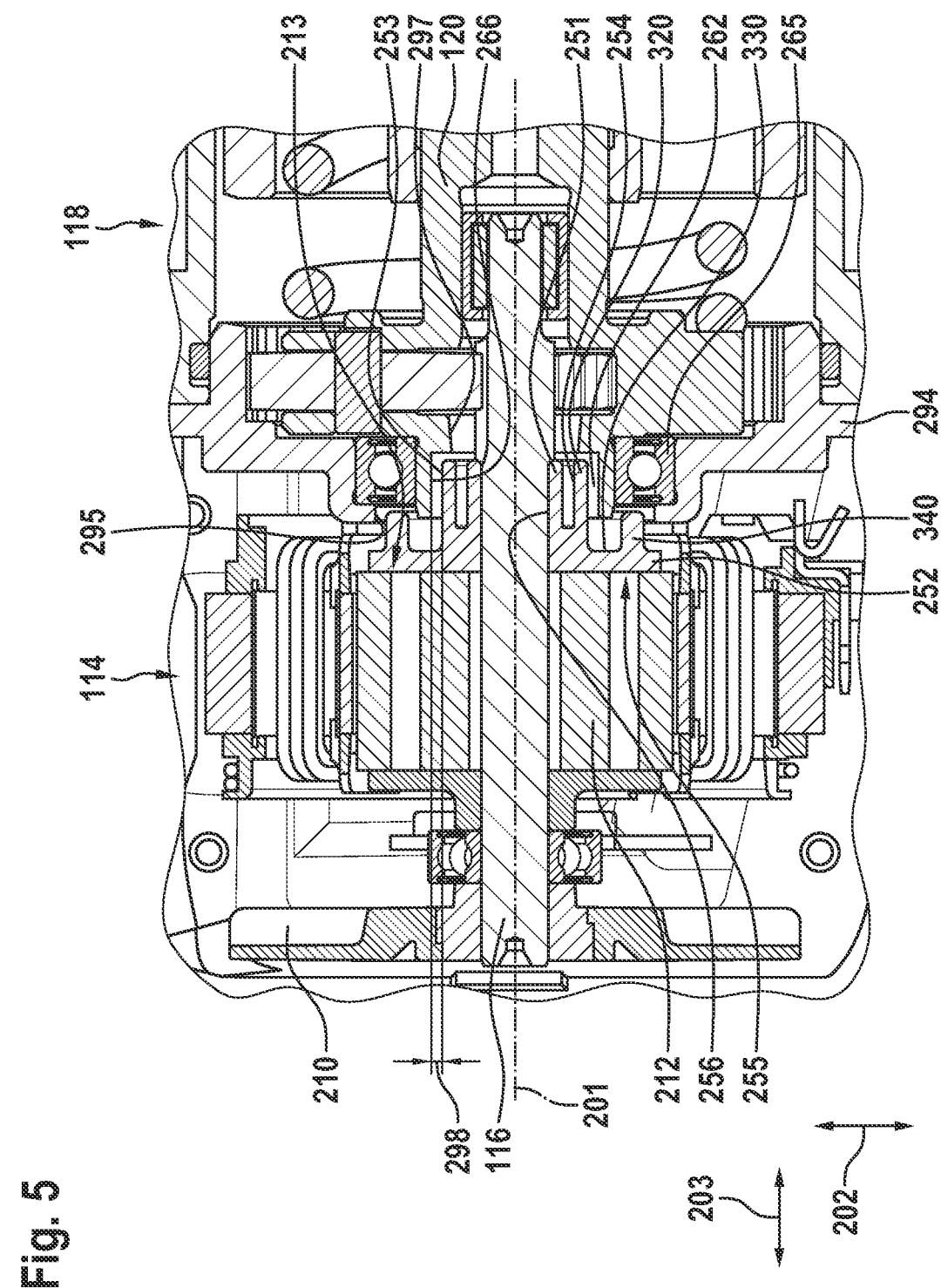

FIG. 5 shows the drive motor 114 and the transmission 118 in FIG. 2, as well as the spacer element 550 in FIG. 4. FIG. 5 illustrates the axial engagement of the annular collar 340 with the receptacles 295 of the section 294 of the transmission housing 118. FIG. 5 also shows the axial engagement of the annular collar 320 and the mounting portion 251 with the pot-shaped receptacle 262 of the transmission housing 119. FIG. 5 further illustrates the radial arrangement of the mounting portion 251, the annular collar 320, and the bearing element 265. The mounting portion 251 and the annular collar 320 are in this case arranged radially within the bearing element 265. FIG. 5 further illustrates the radial gap 298 formed between the outer diameter 253 of the annular collar 320 and the inner diameter 266 of the pot-shaped receptacle 262. Preferably, air exchange can also take place through the radial gap 298.

What is claimed is:

1. A hand-held machine tool comprising:
   a tool receptacle; and
   a drive motor having a motor shaft;
   a transmission; and
   a housing in which the drive motor and transmission are arranged,
   wherein:
   the transmission is arranged in a transmission housing,
   a spacer element is arranged between the transmission and the drive motor, the spacer element comprising a disc-shaped base body on which a tubular mounting portion is arranged, the mounting portion designed for mounting on the motor shaft,
   the spacer element forms a labyrinth seal,
   the transmission comprises an intermediate shaft which forms a pot-shaped receptacle, and
   at least portions of the mounting portion are arranged in the pot-shaped receptacle.

2. The hand-held machine tool according to claim 1, wherein:
   the mounting portion of the spacer element engages the motor shaft along the transmission housing in a direction of an axis of rotation of the tool receptacle.

3. The hand-held machine tool according to claim 1, wherein:
   the drive motor comprises a rotor, and
   a front side of the disc-shaped base body facing away from the mounting portion adjoins the rotor.

4. The hand-held machine tool according to claim 1, wherein:
   a front side of the mounting portion facing the transmission comprises at least one receptacle which is designed to collect lubricant coming from the transmission.

5. The hand-held machine tool according to claim 4, wherein:
   the receptacle is designed according to a type of annular ring segment or annular ring.

6. The hand-held machine tool according to claim 1, wherein:
   the transmission comprises a bearing element fixed in the transmission housing in which bearing element the pot-shaped receptacle of the intermediate shaft is rotatably supported.

7. The hand-held machine tool according to claim 6, wherein:
   at least sections of the bearing element and the mounting portion are arranged coaxially with respect to one another.

8. The hand-held machine tool according to claim 6, wherein:
   the disc-shaped base body features an outer diameter that is greater than an inner diameter of the bearing element.

9. The hand-held machine tool according to claim 1, wherein:
   a radial gap is formed between an outer diameter of the mounting portion and an inner diameter of the pot-shaped receptacle.

* * * * *